Figure 1:
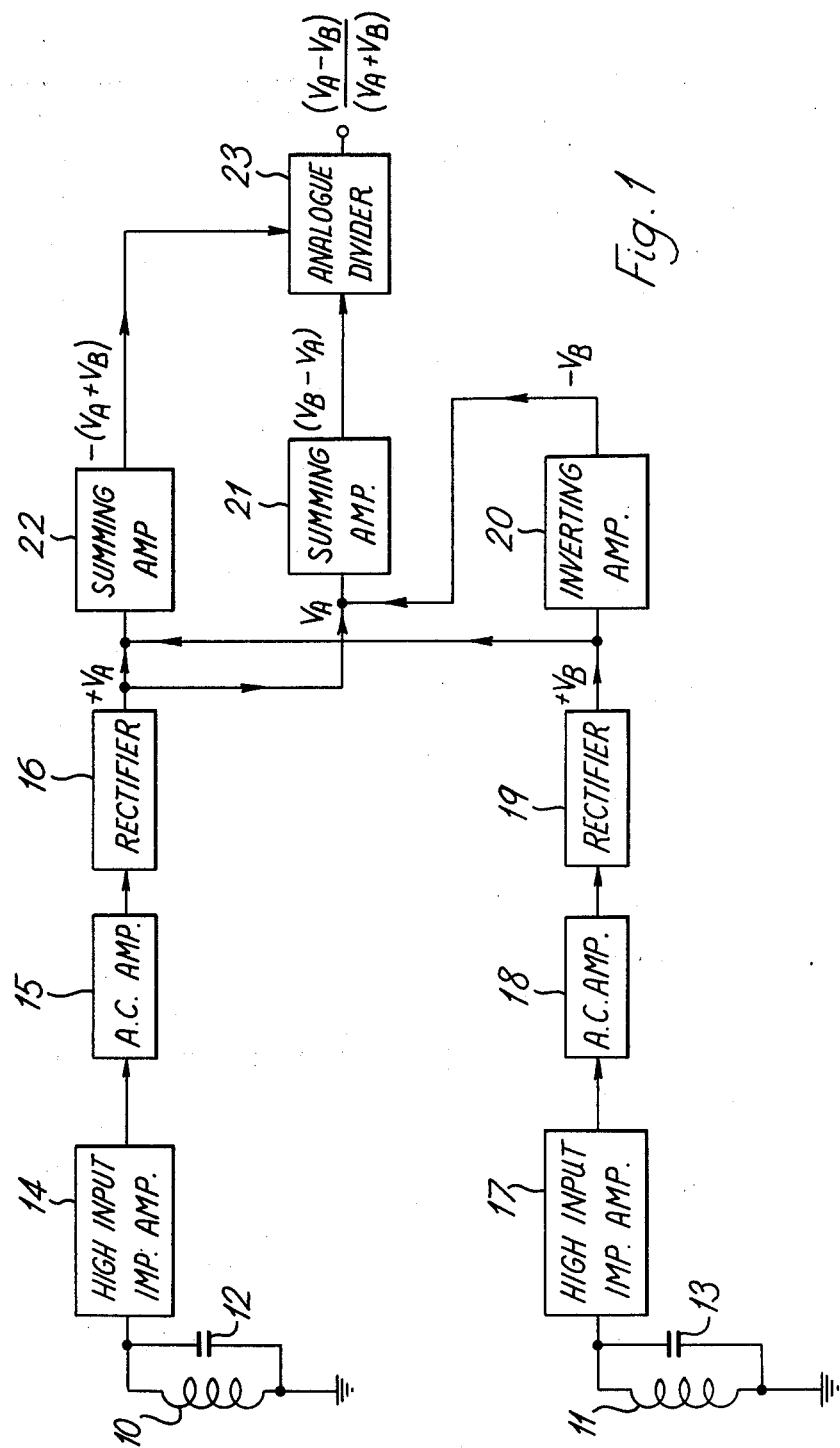

United States Patent [19]

Dobson

[11] 4,079,801

[45] Mar. 21, 1978

[54] VEHICLE GUIDANCE SYSTEMS

[75] Inventor: John Spencer Dobson, Basingstoke, England

[73] Assignee: National Research Development Corporation, London, England

[21] Appl. No.: 711,373

[22] Filed: Aug. 3, 1976

Related U.S. Application Data

[63] Continuation of Ser. No. 512,981, Oct. 7, 1974, abandoned.

[30] Foreign Application Priority Data

Oct. 11, 1973 United Kingdom ............... 47490/73

[51] Int. Cl.² .............................................. B62D 1/28
[52] U.S. Cl. ..................................... 180/98; 318/587; 318/607
[58] Field of Search ................. 180/98, 79.1; 318/587, 318/606, 607

[56] References Cited

U.S. PATENT DOCUMENTS

| | | | |
|---|---|---|---|
| 3,039,554 | 6/1962 | Hosking | 180/79.1 |
| 3,482,644 | 12/1969 | Krieger | 180/79.1 |
| 3,669,207 | 6/1972 | Fellgett | 180/98 |
| 3,696,882 | 10/1972 | Martin | 180/98 |

Primary Examiner—Philip Goodman
Assistant Examiner—John P. Silverstrim
Attorney, Agent, or Firm—Cushman, Darby & Cushman

[57] ABSTRACT

A vehicle guidance system is described in which vehicles are steered in accordance with signals picked up from a leader conductor positioned along a route. By passing two signals at different frequencies along the leader conductor and having two receivers on each vehicle, each sensitive to one of the frequencies only, interfering signals from currents induced in other conductors along the route, such as reinforcing bars in concrete roads or structures are substantially eliminated. Ways of combining the signals from the receivers to provide interference free steering control signals are described.

9 Claims, 4 Drawing Figures

VEHICLE GUIDANCE SYSTEMS

This is a continuation, of application Ser. No. 512,981 filed Oct. 7, 1974 (now abandoned).

The present invention relates to vehicle guidance systems in which an alternating current (a.c.) signal is passed along a leader conductor or conductors, and vehicles are equipped with receivers in which currents are induced. Signals derived from the induced currents are then used to steer the vehicle making it follow the conductor.

One problem with such guidance systems is that currents are induced in fixed conductors along the route, particularly reinforcing bars in concrete or concrete based carriageways. These currents in fixed conductors also induce currrents in vehicle receivers and cause steering errors to occur. For example the reinforcing matrix in a concrete road typically causes a vehicle travelling at 25 m.p.h. to oscillate about the correct path at a frequency of about 1 Hz with an amplitude of ± 6 inches.

According to a first aspect of the present invention there is provided a vehicle guidance system, including a leader conductor along a route to be followed by vehicles, means for passing first and second alternating current signals at first and second frequencies, respectively along the leader conductor, and at least one vehicle having a steering control unit comprising receiver means for receiving signals induced by currents in the leader conductor, operational means for deriving from the signals induced a control signal dependent on the transverse position of the vehicle relative to the leader conductor but substantially independent of signals induced by the first and second alternating currents in fixed conductors in the neighbourhood of the leader conductor, and control means for steering the vehicle in accordance with the control signal.

According to a second aspect of the present invention there is provided a route for guided vehicles, including a leader conductor along a route to be taken by vehicles, and means for passing first and second alternating current signals at different frequencies along the conductor.

According to a third aspect of the present invention there is provided a steering control unit for a vehicle which is to be used on a route having a leader conductor along the route carrying first and second alternating current signals at first and second frequencies, respectively, the steering control unit including receiver means for receiving signals induced by currents in a leader conductor, and operational means for deriving from the signals induced a control signal dependent on the transverse position of the vehicle relative to the leader conductor but substantially independent of signals induced by the first and second alternating currents in fixed conductors in the neighbourhood of the leader conductor.

The receiver means may include first and second receivers sensitive to signals at the first and second frequencies, but not to signals at the second and first frequency, respectively, each receiver comprising first and second coils, in use, spaced apart transverse to direction of travel of the vehicle, and means for combining the signals induced in the coils by the signals in the leader conductor to provide an output signal dependent on the transverse position of the vehicle relative to the leader conductor.

The operational means may include first summing means for providing a sum signal proportional to the sum of the output signals of the first and second receivers, subtraction means for providing a difference signal proportional to the difference between the output signals of the first and second receivers, and second summing means for providing the control signal proportional to the sum of the sum signal and the difference signal, the relative magnitude of the difference signal to the sum signal as applied to the second summing means being such that the control signal is substantially independent of signals induced in conductors near the leader conductor.

It will be apparent from the following explanation that the operational means will, if properly devised and constructed, provide the required signal.

The e.m.f. induced in a conductor near the leader conductor when subjected to an alternating magnetic field:

$$E \propto d\phi/dt$$

Therefore $E \propto \omega \Phi \cos \omega t$ \hfill (1)

When $\phi = \Phi \sin \omega t$, $\phi$ is the instantaneous magnetic flux and $\Phi$ the peak magnetic flux of the alternating field. The secondary magnetic field produced by the induced e.m.f. will be opposition to the main field.

The secondary magnetic field produced by the induced e.m.f. will be in opposition to the main field.

Consequently, if each of the first and second receivers should provide a d.c. voltage ($Vg$) due to the leader conductor and proportional to vehicle tracking error, the actual output voltage VT provided will be $$VT = Vg - V_E \tag{2}$$

where $V_E$ is the voltage due to the secondary field from a conductor or conductors near the leader conductor.

When the leader conductor is energized with two frequencies and voltages proportional to tracking error are produced then $$VT_1 = Vg_1 - VE_1 \tag{3}$$

and $$VT_2 = Vg_2 - VE_2 \tag{4}$$

equation (3) plus equation (4) gives $$VT_1 + VT_2 = Vg_1 + Vg_2 - (VE_1 + VE_2) = V \text{ sum} \tag{5}$$

equation (3) minus equation (4) gives $$VT_1 - VT_2 = Vg_1 - Vg_2 + (VE_2 - VE_1) = V \text{ diff} \tag{6}$$

$$\text{As } Vg_1 = VG_2 \text{ then } VE_2 - VE_1 = VT_1 - VT_2 \tag{6a}$$

Now equation (1) shows that VE is proportional to a function of frequency and this proportionality depends on the characteristic parameters of the metal reinforcing.

Hence $VE_1 = KF(f_1)$ \hfill (7)

and $VE_2 = KF(f_2)$ \hfill (8)

where K represents the characteristic parameter of the reinforcing.

Subtracting equation (8) from equation (7) gives $$K[F(f_2) - F(f_1)] = VE_2 - VE_1 \quad (10),$$

and adding equation (8) to equation (7) gives $$K[F(f_2) + F(f_1)] = VE_2 + VE_1 \quad (11),$$

Therefore by combining equations (10) and (11) and rearranging gives $$VE_2 + VE_1 = VE_2 - VE_1 \left[ \frac{F(f_2) + F(f_1)}{F(f_2) - F(f_1)} \right]$$

$$= A(VE_2 - VE_1)$$

$$= A(VT_1 - VT_2) \quad (12)$$

where A is constant depending on the frequencies used. Subst. in (5) gives $$Vg_1 + Vg_2 = VT_1 + VT_2 + A(VT_1 - VT_2) \quad (13)$$

Hence if the operational means includes the above arrangement of first and second summing means and subtraction means, with correctly adjusted proportionalities a steering control signal is obtained which is independent of $VE_1$ and $VE_2$.

The operational means may take other forms, for example equation 13 may be re-written as $$Vg_1 + VG_2 = VT_1(1+A) + VT_2(1-A),$$

and hence the operational means may include first and second amplifier means of gain $1 + A$ and $1 - A$ connected to receive the output signals of the first and second receivers, respectively, and summing means for providing a sum signal proportional to the sum of the output signals of the first and second amplifier means.

In practice the first and second amplifier means are of variable gain to allow their gains to be adjusted to $1 + A$ and $1 - A$, respectively.

It has been found experimentally that $F(f) = f^{3/2}$ over the audio range.

Figure 2:
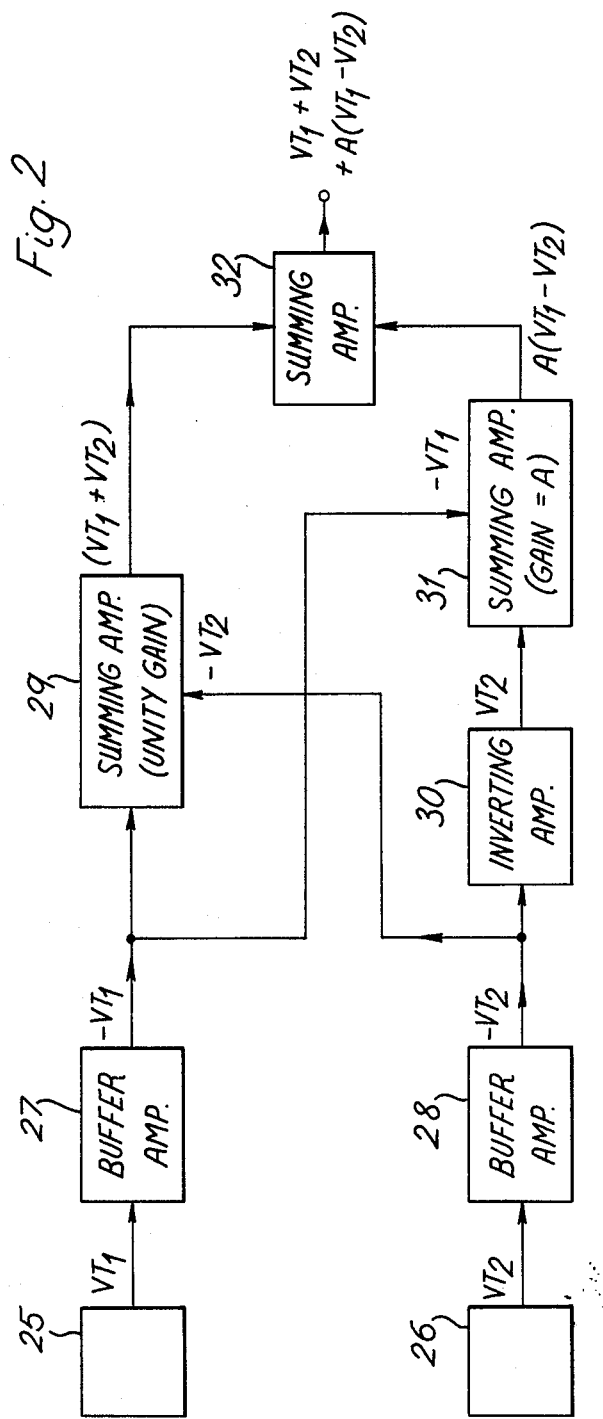
Figure 3:
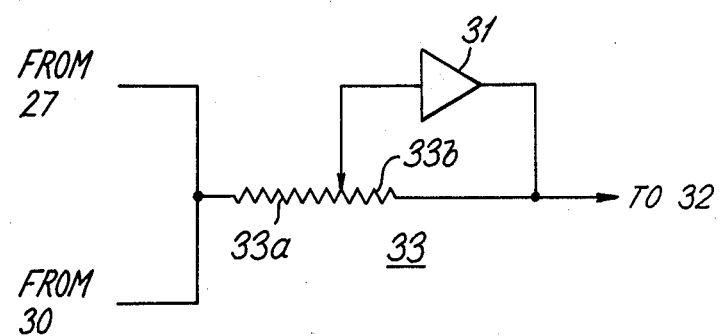
Figure 4:
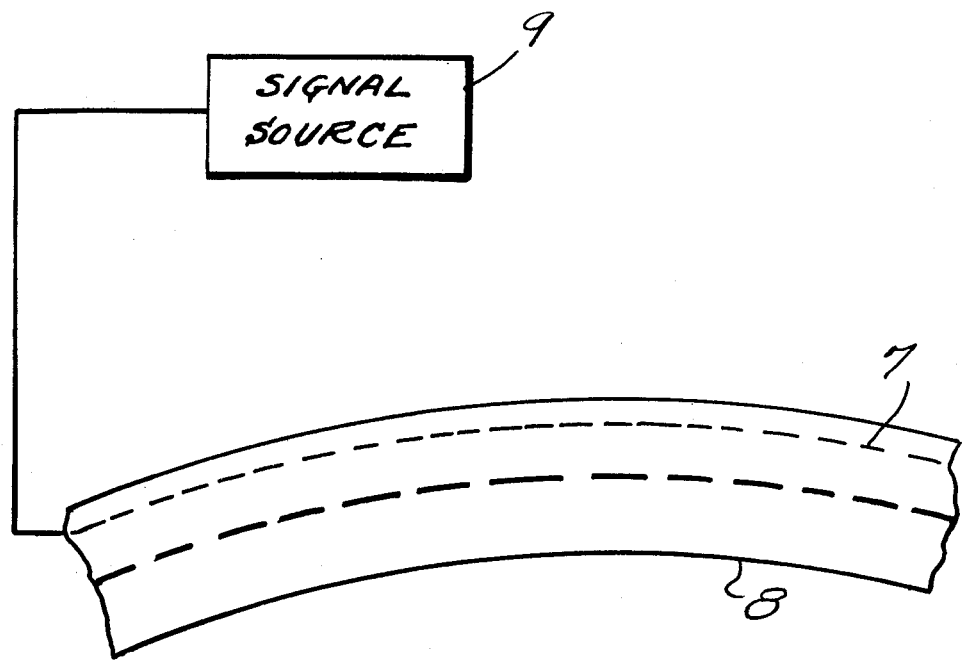

Certain embodiments of the invention will now be described, by way of example, with reference to the accompanying drawings, in which:

FIG. 1 is a block diagram of a circuit for providing a steering control signal for a vehicle, FIG. 2 is a block diagram of a circuit according to the invention for providing a steering control signal which is independent of currents induced in conductors in the neighbourhood of a leader conductor, FIG. 3 shows the summing amplifier 31 of FIG. 2 in more detail, and FIG. 4 is a plan view of a road with a leader conductor indicated below the road surface.

In the embodiments to be described a road vehicle guidance system utilises a leader conductor to be followed by vehicles. Usually the conductor 7 (see FIG. 4) is buried just below a surface of the road from a single source 9. A low level alternating current is passed along the cable and induces voltages in two sensing coils on the vehicle. The sensing coils are placed one on each side of the vehicle and the difference between voltages induced in the coils is proportional to the horizontal transverse distance of the centre of the vehicle from the cable. As has been mentioned, the signals in the cable also induce voltages in conductors in the neighbourhood of the cable and the currents resulting from these in turn induce further voltages in the vehicle's sensing coils. Thus a steering control signal derived from voltages in the sensing coils does not represent the true transverse distance from the cable where conductors, such as re-enforcing mats in a concrete road, are in the neighbourhood of the cable.

This problem can be largely overcome by passing two low level alternating currents (typically each of 150 milliamps) at a different audio frequencies along the cable. A steering control unit on the vehicle then includes circuits for eliminating the effect of conductors adjacent to the cable.

The steering unit includes two circuits of the type shown in FIG. 1, each of which produces a steering control signal (VT) proportional to horizontal displacements from the cable but containing an error due to other conductors.

In FIG. 1 two sensing coils 10 and 11 are located on opposite sides of a vehicle. Capacitors 12 and 13 tune the coils 10 and 11 to the same frequency, the frequency being that of one of the signals in the buried cable. The coil 10 is connected through a high impedance amplifier 14 which does not affect the "Q" of the sensing coil, to a type SN72558 integrated circuit connected as an a.c. amplifier 15. The output of the amplifier 15 is rectified using a full wave rectifier 16 to provide a direct voltage $V_A$ proportional to the amplitude of the signal induced in the coil 10. Similarly a high impedance amplifier 17, a further type SN72558 a.c. amplifier 18 and a full wave rectifier circuit 19 are connected to provide a voltage $V_B$ proportional to the magnitude of signals induced in the coil 11.

The voltage $V_B$ is subtracted from the voltage $V_A$ by inversion in a type SN72558 integrated circuit connected as an inverting amplifier 20 and addition in a further type SN72558 integrated circuit connected as a summing amplifier 21. The output signal from the summing amplifier 21 is proportional to the transverse distance from the leader cable but the amplitudes of $V_A$ and $V_B$ depend on the cable energising current, and other factors, such as the distance the cable is buried, so that automatic gain control is required. This is provided by adding the voltages $V_A$ and $V_B$ in a type SN72558 summing amplifier 22 and dividing the output of the amplifier 21 by that of the amplifier 22 in an ANCOM type D1 analogue divider 23.

In FIG. 2 circits 25 and 26 are each as shown in FIG. 1. However, the coils 10 and 11 of the circuit 25 are tuned to one of the audio frequencies of the signals in the leader cable and the coils 10 and 11 in the circuit 26 are tuned to the frequency of the other audio signal passing along the cable. The output signals $VT_1$ and $VT_2$ of the circuits 25 and 26 are passed to inverting buffer amplifiers 27 and 28, respectively. A unity gain summing amplifier 29 adds and inverts the output signals from the amplifiers 27 and 28 to provide a signal $(VT_1 + VT_2)$. The output signal from the buffer amplifier 28 is inverted in an amplifier 30 and added to the output signal from the amplifier 27 in a summing amplifier 31 of gain A. Thus the output of the amplifier 31 is $A(VT_1 - VT_2)$ where A is adjusted to equal the value derived in the above mentioned equation 12. The outputs of the amplifiers 29 and 31 are passed to a further summing amplifier 32 which does not invert and the output of this amplifier is the required d.c. steering control voltage which is applied to a servo mechanism controlling the position of the vehicle's steering wheel, or the angle of the road wheels which steer the vehicle. In practice the gain A is adjusted empirically until the effects of conductors in the vicinity of the leader cable are at a minimum. A potentiometer 33 (see FIG. 3) is connected as shown to vary the gain of the amplifier 31. This potentiometer is chosen so that the ratio of the resistances of the parts 33a and 33b and hence the amplifier gain can be varied about the value of A as calculated from $F(f) = f^{\alpha}$, $$A = \left[\frac{F(f_2) + F(f_1)}{F(f_2) - F(f_1)}\right]$$

and the values of $f_1$ and $f_2$.

All the circuits of FIG. 2, other than the circuits 25 and 26, may be type SN72558 integrated circuits connected as required to perform the various functions described.

The invention has been specifically described in connection with road vehicles but it can, of course, be applied to other vehicles such as vehicles moving goods in a warehouse or aircraft autotaxing. It will also be evident that the invention can be put into practice in many other ways, for instance, without using the specifically described circuits.

I claim:

1. A vehicle guidance system, including a leader conductor along a route, means for passing first and second alternating current signals at first and second different frequencies, respectively, along the leader conductor, and at least one vehicle for movement along the route, the vehicle including receiver means, in which in operation first and second signals are induced, for providing from the induced signals first and second receiver-output signals when moving along the route, operational means for deriving from the first and second receiver-output signals a control signal which varies as a function of the transverse position of the vehicle relative to the leader conductor but which is substantially independent of the component of the said first and second receiver-output signals due to the signals induced in the receiver means by current signals which are induced in fixed conductors in the neighborhood of the leader conductor by the first and second alternating current signals, and control means for steering the vehicle along the route in accordance with said control signal.

2. A system as in claim 1, wherein the first and second respective frequencies are within the audio range.

3. A steering control unit for a vehicle which is to be used along a route having a leader conductor along the route carrying first and second alternating current signals at first and second different frequencies, respectively, the steering control unit including receiver means in which in operation first and second signals are induced, respectively, for providing first and second receiver-output signals when the vehicle is moving along the route, and operational means for deriving from the first and second receiver-output signals a control signal which varies as a function of the transverse position of the vehicle relative to the leader conductor but which is substantially independent of the component of the said first and second receiver-output signals due to the signals induced in the receiver means by current signals which are induced in fixed conductors in the neighborhood of the leader conductor by the first and second alternating current signals.

4. A steering control unit according to claim 3, wherein the receiver means includes first and second receivers sensitive to signals at the first and second frequencies respectively, but not to signals at the second and first frequency, respectively, each receiver comprising first and second coils, in use, spaced apart transverse to direction of travel of the vehicle, and means for combining the signals induced in the coils by the signals in the leader conductor to provide an output signal dependent on the transverse position of the vehicle relative to the leader conductor, the output signals from said first and second receivers forming said first and second receiver-output signals respectively.

5. A steering control unit according to claim 4 wherein the operational means includes first summing means for providing a sum signal proportional to the sum of the first and second receiver-output signals of the first and second receivers, subtraction means for providing a difference signal proportional to the difference between the first and second receiver-output signals, and second summing means for providing the control signal proportional to the sum of the sum signal and the difference signal, the relative magnitude of the difference signal to the sum signal was applied to the second summing means being such that the control signal is substantially independent of the component of the first and second receiver-output signal due to the signals induced in the receivers by current signals which are induced in fixed conductors in the neighbourhood of the leader conductor by the first and second alternating current signals.

6. The steering control unit according to claim 4, wherein the operational means includes first summing means for providing a sum signal proportional to the sum of the output first and second receiver-output signals of the first and second receivers, subtraction means for providing a difference signal proportional to the difference between the first and second receiver-output signals, second summing means for providing the control signal proportional to the sum of the sum signal and the difference signal, and means for adjusting the relative magnitude of the difference signal to the sum signal, as applied to the second summing means to ensure that the control signal is substantially independent of the component of the first and second receiver-output signals due to the signals induced in the receivers by current signals which are induced in fixed conductors in the neighbourhood of the leader conductor by the first and second alternating current signals.

7. A steering control unit according to claim 6 wherein the means for adjusting the said relative magnitude has a range of adjustment varying through the relative magnitude value $$A = \left[\frac{F(f_2) + F(f_1)}{F(f_2) + F(f_1)}\right],$$

where $F(f_1)$ and $F(f_2)$ are functions relating the first and second frequencies to error voltages in the first and second receivers, respectively, due to conductors near the leader cable.

8. A steering control unit according to claim 7 wherein $F(f_1)$ and $F(f_2)$ are substantially $f_1^{\alpha}$ and $f_2^{\alpha}$, respectively, where $F_1$ and $F_2$ are the first and second frequencies, respectively.

9. A vehicle guidance system including:

a leader conductor disposed along a vehicle route to be followed;

means for passing first and second alternating current signals at first and second different frequencies, respectively, along said conductor; and a vehicle steering control comprising a first receiver having a first signal induced therein by said first alternating current signal, for producing from the induced signal a first receiver-output signal which varies as a function of said first current signal and the transverse position of the vehicle relative to said conductor, a second receiver having a second signal induced therein by said second alternating current signal, for producing a second receiver-output signal from the induced signal which varies as a function of said second current signal and the transverse position of the vehicle relative to said conductor, said first and second receiver-output signals also depending on signals induced in the receivers by current signals which are induced in fixed conductors in the neighborhood of the leader conductor by the first and second alternating current signals, operational means deriving from the first and second receiver-output signals a control signal which also varies as a function of the transverse position of the vehicle relative to the leader conductor but which is substantially independent of the component of said first and second receiver-output signals due to signals induced in the receivers by said current signals induced in the said fixed conductors, and control means for steering said vehicle along said route in accordance with said control signal.

* * * * *